Mar. 27, 1923.
G. E. MILLER.
PIPE JOINT.
FILED FEB. 1, 1922.
1,449,773.
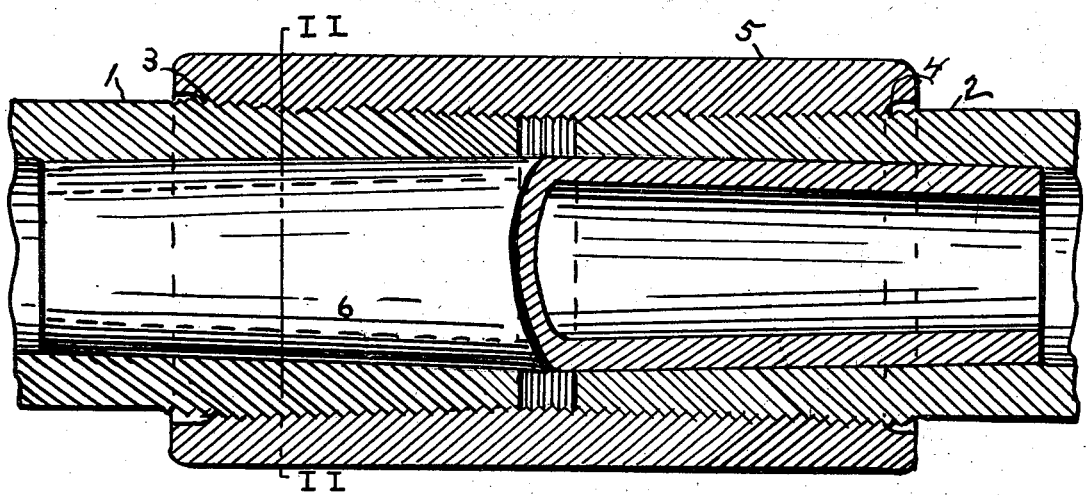
Fig.1
Fig.2
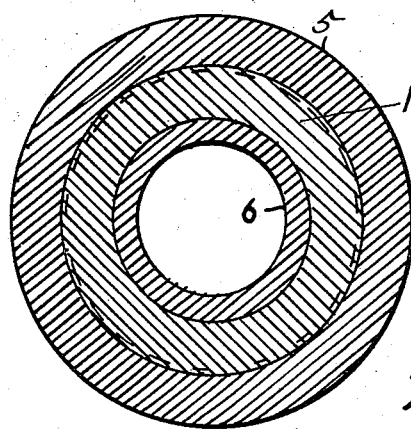
Fig.3
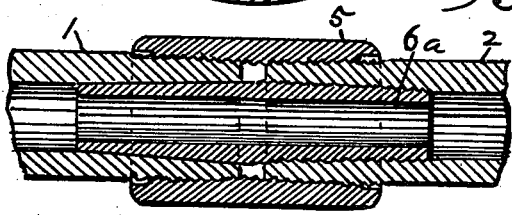
WITNESS
P. F. Dilworth
INVENTOR
G. E. Miller
by F. N. Barber
Attorney Patented Mar. 27, 1923.

1,449,773

UNITED STATES PATENT OFFICE.

GEORGE E. MILLER, OF ETNA, PENNSYLVANIA.

PIPE JOINT.

Application filed February 1, 1922. Serial No. 533,429.

*To all whom it may concern:*

Be it known that I, GEORGE E. MILLER, a citizen of the United States, residing at Etna, in the county of Allegheny and State of Pennsylvania, have invented new and useful Improvements in Pipe Joints, of which the following is a specification.

My invention relates to pipe joints and the object thereof is to provide two pipes connected together by a threaded coupling and having an internal reinforcement at the places where the joint is the weakest.

Referring to the accompanying drawing, Fig. 1 is a central longitudinal section of a pipe-joint embodying the principle of my invention; Fig. 2, a cross-section of Fig. 1 on the line II—II; and Fig. 3, a view showing a modification of Fig. 1.

On Figs. 1 and 2 of the drawing, 1 and 2 designate two metal pipes in axial alinement having their opposing ends externally threaded, as shown at 3 and 4, for a short distance. 5 designates a pipe-coupling internally threaded at both ends and screwed on the threads 3 and 4 to couple the pipes 1 and 2 together in the usual manner.

The coupling 5 reinforces the ends of the pipes to the ends of the coupling where the joint without my improvement is the weakest since at and beyond the ends of the coupling the pipes are not reinforced, and they are here cut partially through by the threads 3 and 4 which almost always extend for a few turns beyond the threads in the coupling.

The interiors of the pipes 1 and 2 are tapered slightly from their ends to a distance well beyond the threads 3 and 4 and the threaded end of the coupling 5. 6 is a hollow metal fitting having its exterior tapered from its middle in both directions so as to accurately fit the tapers in the ends of the tubes. The size of the fitting at its center is preferably such that the ends of the tubes can not be made to touch each other when the coupling is operated to draw the pipes toward each other. As the coupling draws the pipes toward each other the fitting is caused to make a tighter fit with the pipe-ends. The ends of the fitting extend well beyond the threads 3 and 4 and the end threads on the pipes 1 and 2. The fitting and the tapers in the tube-ends extend beyond the said threads on the pipe-ends and in the coupling so as to produce a strong reinforcement at and beyond the said weakest portions of the joint. The length of this reinforcement will vary according to the strength of the metal in the pipe-ends, the depth of the threads therein, the thickness of the pipe-walls, and the thickness and the character of the metal in the fitting. The fitting is to be made stiff and strong enough to afford substantial additional strength to the joint, and is not to be confused with thin sleeves to prevent rust at the joint.

In Fig. 3, I show the fitting 6ª with one end screwed into one of the pipe ends. This construction has the advantage of having the fitting rigidly held in place while the coupling is being effected. The screw-threaded opening in the pipe may be tapered or not as desired.

I claim—

1. In a pipe-joint, a pair of opposed pipes externally threaded for a short distance from their ends and having their interiors tapered well beyond the threads on the pipes, a coupling screwed upon the said threads, and a tubular fitting having tapered ends fitting the tapers in the tubes, the fitting being of such dimensions, and the tapers in the tubes and on the fitting being coextensive for such a distance beyond the threads on the coupling and pipes, as to afford substantial reinforcement to the joint at and beyond the threads in the coupling.

2. In a pipe-joint, a pair of opposed pipes externally threaded for a short distance from their ends and having their interiors tapered well beyond the threads on the pipes, a coupling screwed upon the said threads, and a tubular fitting having tapered ends fitting the tapers in the tubes, the fitting being of such dimensions, and the tapers in the tubes and on the fitting being coextensive for such a distance beyond the threads on the coupling and pipes, as to afford substantial reinforcement to the joint at and beyond the threads in the coupling, and one end of the fitting having screw threads fitting screw threads in the end of one of the pipes.

Signed at Pittsburgh, Pa., this 28th day of January, 1922.

GEORGE E. MILLER.